United States Patent
Ross et al.

(10) Patent No.: US 7,602,446 B2
(45) Date of Patent: Oct. 13, 2009

(54) METHOD, SYSTEM AND DEVICE FOR AUXILIARY BUS MIXER AND KEYER

(75) Inventors: David Allan Ross, Nepean (CA); Alun John Fryer, Ontario (CA); Troy David English, Ottawa (CA)

(73) Assignee: Ross Video Limited, Iroquois, Ontario (CA)

( * ) Notice: Subject to any disclaimer, the term of this patent is extended or adjusted under 35 U.S.C. 154(b) by 819 days.

(21) Appl. No.: 11/087,830

(22) Filed: Mar. 24, 2005

(65) Prior Publication Data

US 2005/0219417 A1    Oct. 6, 2005

Related U.S. Application Data

(60) Provisional application No. 60/556,501, filed on Mar. 26, 2004.

(51) Int. Cl.
*H04N 5/262* (2006.01)

(52) U.S. Cl. .................. 348/578; 348/584; 348/722; 348/598; 348/591

(58) Field of Classification Search ............ 348/578, 348/584, 585, 586, 598, 590, 591, 722; 715/723, 715/726

See application file for complete search history.

(56) References Cited

U.S. PATENT DOCUMENTS

| 4,694,344 | A  | * | 9/1987  | Flora .................. 348/584 |
|-----------|----|---|---------|----------------------------------|
| 5,231,499 | A  | * | 7/1993  | Trytko ................ 348/585 |
| 5,982,456 | A  | * | 11/1999 | Smith et al. .......... 348/722 |
| 7,019,788 | B2 | * | 3/2006  | Iizuka et al. ......... 348/584 |
| 7,034,886 | B2 | * | 4/2006  | Ross et al. ........... 348/445 |
| 7,302,644 | B2 | * | 11/2007 | Holtz et al. .......... 715/720 |
| 2005/0030432 | A1 | * | 2/2005 | Ross et al. ........... 348/705 |

* cited by examiner

*Primary Examiner*—David L. Ometz
*Assistant Examiner*—Jean W Désir
(74) *Attorney, Agent, or Firm*—Nixon Peabody LLP; Jeffrey L. Costellia (57) ABSTRACT

A method, system, and device for video production, including adding a mixer to an Auxiliary Bus of a Video Production Switcher; adding one or more keyers to the Auxiliary Bus of the Video Production Switcher; and adding special effects to the Auxiliary Bus.

156 Claims, 4 Drawing Sheets

METHOD, SYSTEM AND DEVICE FOR AUXILIARY BUS MIXER AND KEYER

CROSS REFERENCE TO RELATED DOCUMENTS

The present invention claims benefit of priority to U.S. Provisional Patent Application Ser. No. 60/556,501 of ROSS et al., entitled "Method, System and Device for Auxiliary Bus Mixer and Keyer," filed Mar. 26, 2004, the entire disclosure of which is hereby incorporated by reference herein.

BACKGROUND

1. Field of the Invention

The present invention generally relates to real-time, live video production systems, and more particularly to a method, system and device for providing mixing and layering capabilities to outputs of a Video Production Switcher.

2. Discussion of the Background

A video production switcher (or switcher) is an apparatus which combines a plurality of video input signals through various means to provide a plurality of video output signals. Each of the output signals includes a composition of one or more of the input signals and other visual elements generated within the switcher. The switcher generally includes a control panel and a number of video processing circuits.

The video processing circuits of the switcher are generally grouped into functional elements. These elements include Mix Effects (M/E) or Multi-Level Effects (MLE). Each M/E includes a number of Keyers. A keyer is a circuit element which allows one video signal to be layered onto another video signal, with transparency of the former determined by a third video signal (referred to as an Alpha signal). Thus, the M/E is capable of combining a number of video signals by layering one video signal upon another in a prioritized sequence.

This layering can be either a background transition (where one full-screen image is revealed underneath another full-screen image), or a key (where one video image covers a portion of another, through use of a transparency signal, or alpha). Typically, an M/E is capable of one or two background transitions, and between 2 and 4 keys simultaneously. The Mix Effect outputs several outputs, which include a combination of the background mixes and keys. A switcher can have one or more M/Es, and can cascade one into another to allow a greater number of video signals to be layered into a final composite image.

Figure 4:
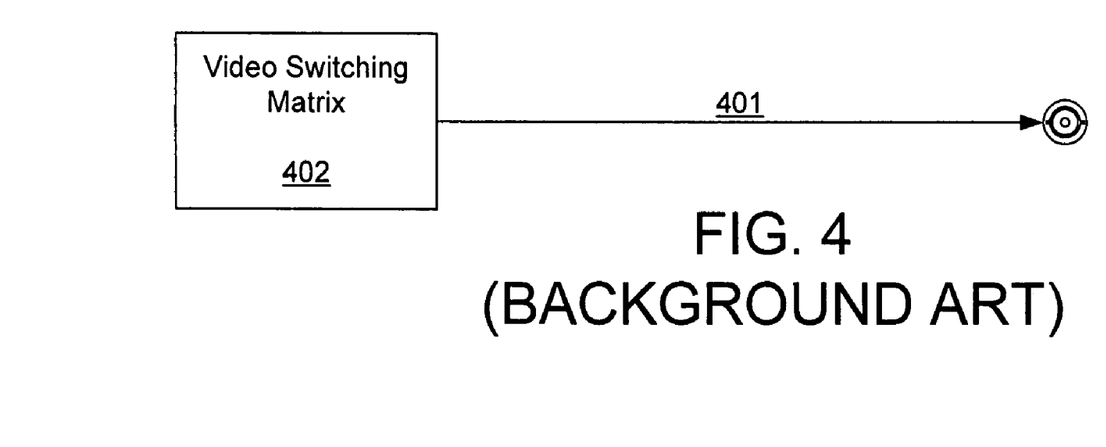
FIG. 4 illustrates a simple background art Auxiliary Bus.
Figure 5:
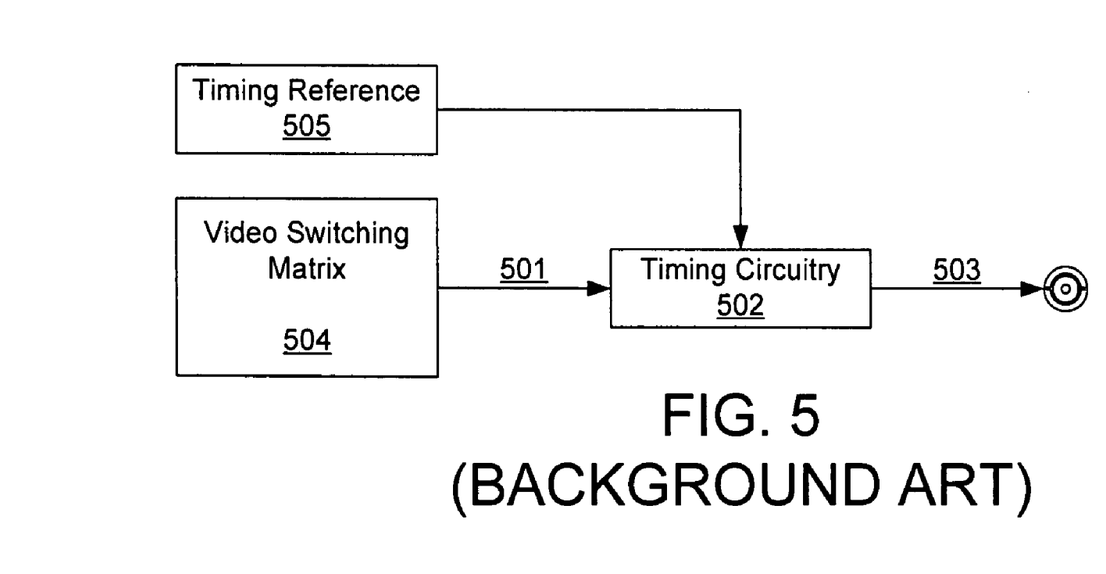
FIG. 5 illustrates a simple background art timed Auxiliary Bus.

The switcher is also capable of routing video signals from its inputs or Mix Effects to some of its output connections, usually through a video switching matrix. These general-purpose video output channels are referred to as Auxiliary Buses, or Aux Buses. A simple Aux Bus is illustrated in FIG. 4. As illustrated in FIG. 5, Aux Buses can also include timing circuitry (502) to allow alignment of its output to be synchronized to a specified reference (505), regardless of the relative alignment of the selected input signal. This is referred to as a Timed Aux Bus.

One or more Mix Effect units can be used to generate the desired program content. This would include switching and mixing between primary video inputs, such as cameras, videotape, satellite feeds, and so on. Additionally, other elements can be layered over these background selections, such as titles, logos, and the like.

In some situations, it is desirable to produce more than one program from the switcher. Often, these outputs can be similar, with only a slight difference in the additional layered elements. Conversely, a completely different layered composition may be required. In either case, one or more Mix Effects units can be allocated to each of these tasks. Examples of these additional programs include: an output with titles in a second language or outputs to stage monitors. These outputs can also be as simple as a single video background branded with a logo.

This approach presents a problem, however, as there are a small, finite number of Mix Effects units available in the switcher. A switcher will generally have between one and four Mix Effects units. This, combined with the fact that it is often desirable to cascade multiple Mix Effects to create more complex effects, leaves the flexibility of multiple feeds from the switcher quite limited.

SUMMARY OF THE INVENTION

Therefore, there is a need for a method, system, and device that addresses the above and other problems with conventional systems and methods. Accordingly, in exemplary aspects of the present invention, a method, system, and device are provided for video production, including adding a mixer to an Auxiliary Bus of a Video Production Switcher; adding one or more keyers to the Auxiliary Bus of the Video Production Switcher; and adding special effects to the Auxiliary Bus.

Still other aspects, features, and advantages of the present invention are readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

A method, system, and device for an Auxiliary (Aux) Bus Mixer and Keyer are described. In the following description, for purposes of explanation, numerous specific details are set forth in order to provide a thorough understanding of the present invention. It is apparent to one skilled in the art, however, that the present invention can be practiced without these specific details or with equivalent arrangements. In some instances, well-known structures and devices are shown in block diagram form in order to avoid unnecessarily obscuring the present invention.

The present invention describes a novel method, system and device to solve the problems posed in the prior art and advances the state of the art by providing mixing and layering capabilities to outputs of a Video Production Switcher.

The present invention includes recognition that video switchers have a small limited number of Mix Effects. Currently 4 Mix Effects are the maximum for most units, but 1, 2 or 3 is quite typical. It is often undesirable to allocate an entire Mix Effect unit to providing an additional, unique program output. This is especially true when these additional outputs need not employ the full layering or special effects capability of the Mix Effect unit. However, adding additional Mix Effects units is costly, and also causes the size of the control panel to grow.

Accordingly, the exemplary embodiments, advantageously, provide the addition of keyers and background mixing to the output of Aux Buses on the switcher. Exemplary circuits can be configured to allow the dynamic allocation of multiple Aux Buses to be used to generate a background mix and keyer. This approach also allows additional keyers to be added, by allocating additional Aux Buses to this task. Advantageously, only the number of Aux Buses present in a given implementation determines the number of keyers that can be added. Thus, there is no logical limit to the number of keyers, wherein keyers can be added until all of the Aux buses are employed for a given implementation. Conversely, a background mix can be implemented, with no additional keyers.

The exemplary embodiments allow for a preview output from the Aux Bus Mixer and/or Keyer. This preview output allows the user of the system to view the resultant video image of the next selected mix transition prior to the execution of that transition, without effecting the image presented on the program output. The exemplary embodiments also allow for a clean feed output from the aux mixer/keyer. This clean feed output is the result of the program and preset video mixing circuit before the keying circuitry.

The exemplary embodiments allow an Aux Bus output to have a dissolve or other types of video transition, such a wipe, and the like, between two video sources, and also allow such a transition to be performed on a key, simultaneously or independently, and the like.

The exemplary embodiments include 1 video input into the Aux Bus processing circuitry for each Aux bus output. Additional inputs to the Aux Bus processor can be employed to provide the additional signals for the background mixing and keying operations. This reduces the total number of Aux Buses available in the system. The user can configure the power and features of an Aux Bus output by allocating Aux Buses to mixing, keying, or simple Aux Bus output functionality. The exemplary embodiments include implementations where the video processing circuitry has additional inputs into the Aux Bus processor instead of using Aux Bus inputs.

The exemplary embodiments allow for the Aux Bus to have timing circuitry and video delay elements built into the Aux Bus inputs. This allows video signals from any suitable location in the switcher to be fed into the Aux Bus and retimed so that the signals in the Aux Bus processing line up temporally.

The exemplary embodiments allow for the Aux Bus to have timing circuitry and video delay elements built into the Aux Bus outputs. Advantageously, the exemplary embodiments allow a user to control the output delay of the Aux Bus output video, wherein the user is able to configure the Aux Buses with desired features.

The circuitry for creating the additional features inside the Aux Buses of the exemplary embodiments can be implemented with discrete circuit elements, one or more ASICs, one or more FPGAs, and the like. These features also can be implemented in software using one or more microprocessors, microcontrollers, digital signal processors, and the like.

Figure 1:
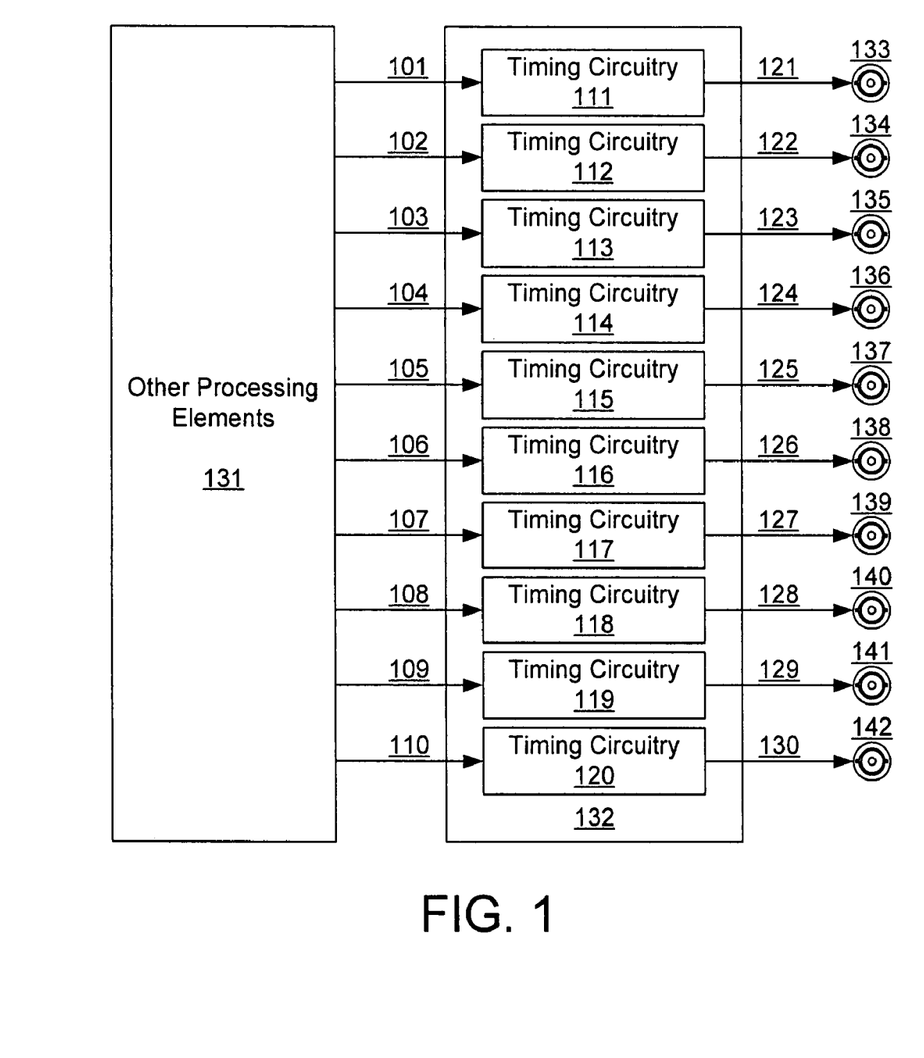
FIG. 1 illustrates an Aux Bus output setup with no Mixer Keyers.

FIG. 1 illustrates a switcher having an Aux Bus output setup with no Mixer Keyers configured. In a typical application, a plurality of input signals (101 to 110) are fed from other processing elements (131), including, Mix Effects, crosspoint switches, and the like, in the switcher. The video then passes through optional timing circuitry (111-120) of the Aux Bus processing block 132 where the video signals can optionally be temporally aligned with a timing reference. Each video signal can be arbitrarily aligned with any suitable timing reference, thus allowing the user to select the temporal position of each output independently. Additional formatting can also be performed within the timing circuitry (111-120). The resulting video (121-130) is then fed out to connectors (133-142). FIG. 1 illustrates a typical implementation of 10 Aux buses, but fewer or greater numbers of Aux buses are possible, according to further exemplary embodiments.

Figure 2:
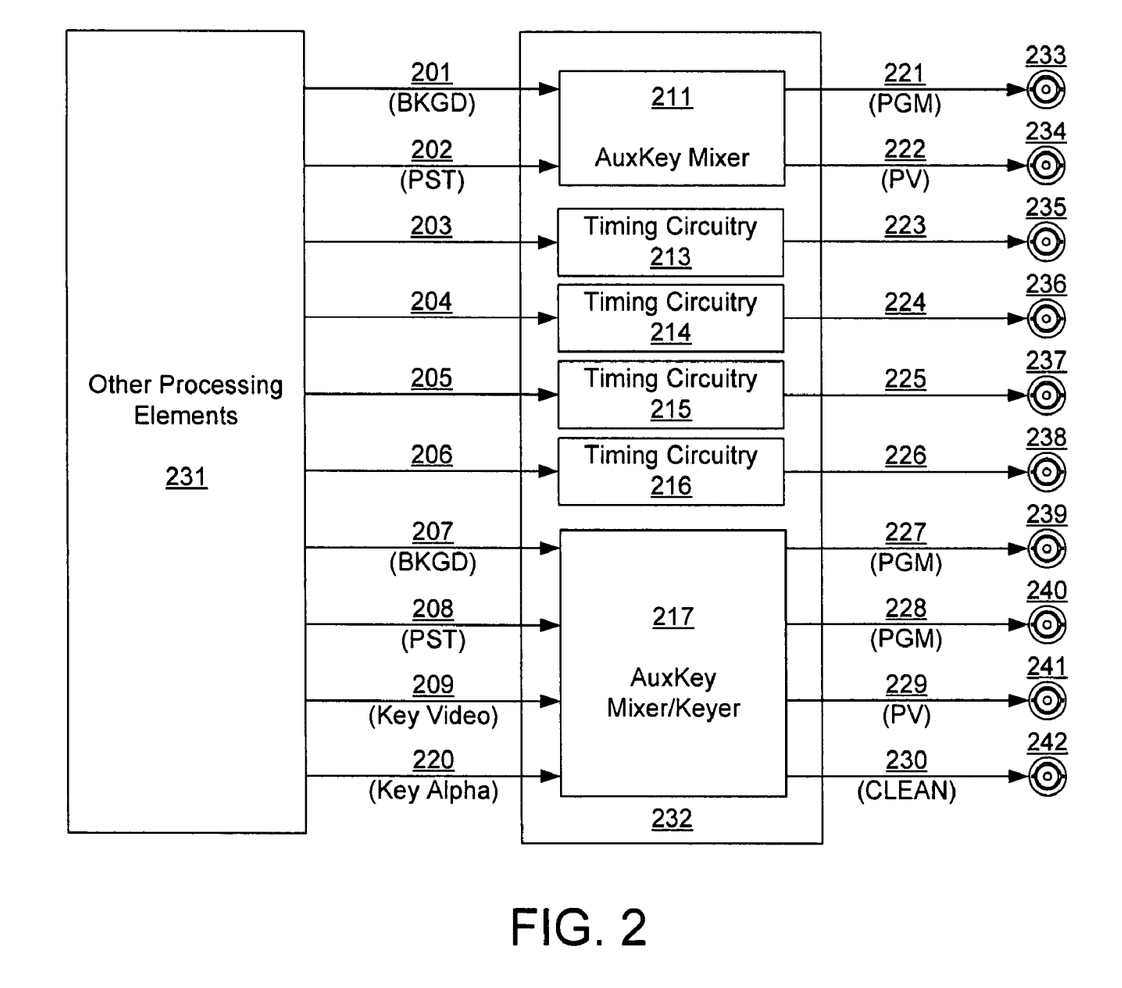
FIG. 2 illustrates an exemplary user configuration, including an Aux Bus Mixer with a Keyer and another Aux Bus with a Mixer, according to the present invention.

FIG. 2 illustrates an exemplary implementation for dynamically allocating video inputs and outputs within Aux Bus circuitry (232), according to the present invention. FIG. 2 illustrates, by example, inputs (201 and 202) allocated as background (BKGD) and preset (PST) inputs to an AuxKey mixer (211). Mixer (211) performs a transition, including a wipe, dissolve, and the like, between the BKGD (201) and PST (202) video signals. The result of the mix is output on the PGM output (221), and a preview is provided, showing the result of the next transition on the PV output (222). Similarly, Mixer (217) performs all of the functionality of Mixer (211), while additionally allowing the inclusion of a keyer, fed by KEY VIDEO (209) and KEY ALPHA (210) input signals. The resulting signals (221-230) are fed out to connectors (233-242).

The exemplary embodiments include the addition of background mixing and keying into an Aux bus output. However, further exemplary embodiments include additional special effects added to an Aux bus output.

The exemplary embodiments also can include a plurality of background mixes or keyer functions, and the like.

The exemplary embodiments allow for the Aux Bus circuitry to generate its own video signals. These signals can be used as the input to the Aux Bus circuitry.

Figure 3:
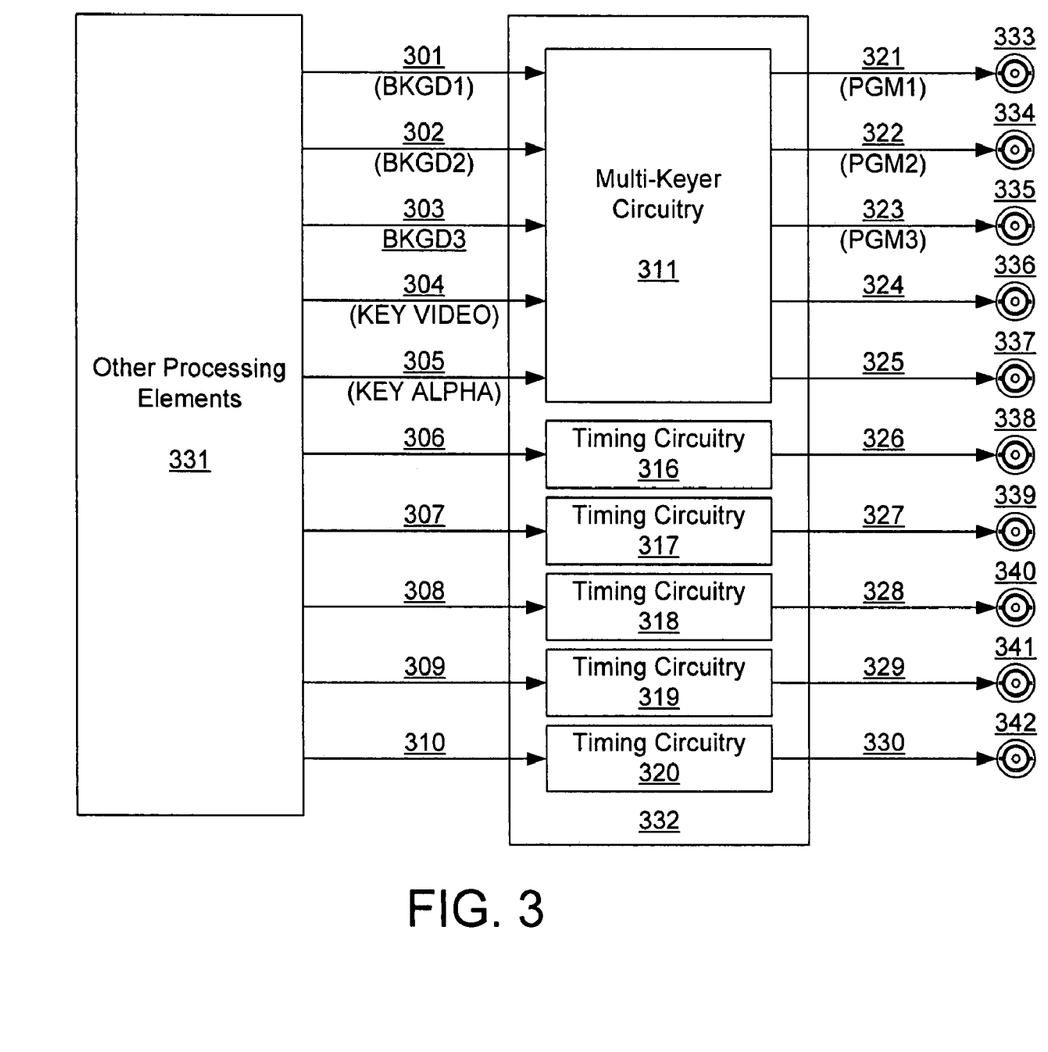
FIG. 3 illustrates an exemplary user configuration, including Aux Buses configured to key on multiple outputs using a key source, according to the present invention.

The exemplary embodiments allow for a single Key video and alpha source to be keyed upon a plurality of background sources, as shown in FIG. 3. FIG. 3 illustrates, by example, KEY VIDEO (304) and KEY ALPHA (305) used to place a key independently on three unique background signals (301, 302, and 303). The resulting signals (321-330) are fed out to connectors (333-342). Advantageously, this approach minimizes the number of inputs to the Aux Bus circuitry (332) that are employed when the same key source is keyed upon multiple background video sources.

As described above, the Aux Bus has provision for adjustment of the timing of its output. The exemplary embodiments allow for the Aux bus output, optionally with one or more background mixers and optionally with one or more keyers, to be timed such that it is earlier than the Mix Effect processing of the switcher. This allows the output of the Aux Bus, optionally with one or more background mixers, and optionally with one or more keyers, to be re-entered into the system's Mix Effect processors.

A video production switcher control panel is capable of controlling the inputs and layering of an Aux Bus Keyer. This can be achieved by adding additional buttons to a control panel, creating additional macros to be used by existing macro buttons on a control panel or by dynamically allocating the functions of existing buttons on a control panel. This user interface can optionally use a Mix Effect "next transition" control philosophy. The control panel can optionally allow the status and dynamic effects of the Aux Bus, optionally including one or more mixers and optionally including one or more keyers, through memory recalls and/or macros and/or timelines or sequences.

In an exemplary embodiment, a PC-based control system can be used for controlling Aux bus inputs and layering. This PC-based system can be used under the direction of a human operator or under the control of a computer automation system. This system can employ a graphical user interface, which can mimic a switcher control panel, with a Mix Effect "next transition" operation, or can employ a different control philosophy and user interface.

The devices and subsystems of the exemplary embodiments described with respect to FIGS. 1-3 can communicate, for example, over a communications network, and can include any suitable servers, workstations, personal computers (PCs), laptop computers, PDAs, Internet appliances, set top boxes, modems, handheld devices, telephones, cellular telephones, wireless devices, other devices, and the like, capable of performing the processes of the disclosed exemplary embodiments. The devices and subsystems, for example, can communicate with each other using any suitable protocol and can be implemented using a general-purpose computer system, and the like. One or more interface mechanisms can be employed, for example, including Internet access, telecommunications in any suitable form, such as voice, modem, and the like, wireless communications media, and the like. Accordingly, the communications network can include, for example, wireless communications networks, cellular communications networks, satellite communications networks, Public Switched Telephone Networks (PSTNs), Packet Data Networks (PDNs), the Internet, intranets, hybrid communications networks, combinations thereof, and the like.

As noted above, it is to be understood that the exemplary embodiments, for example, as described with respect to FIGS. 1-3, are for exemplary purposes, as many variations of the specific hardware and/or software used to implement the disclosed exemplary embodiments are possible. For example, the functionality of the devices and the subsystems of the exemplary embodiments can be implemented via one or more programmed computer systems or devices. To implement such variations as well as other variations, a single computer system can be programmed to perform the functions of one or more of the devices and subsystems of the exemplary systems. On the other hand, two or more programmed computer systems or devices can be substituted for any one of the devices and subsystems of the exemplary embodiments. Accordingly, principles and advantages of distributed processing, such as redundancy, replication, and the like, also can be implemented, as desired, for example, to increase the robustness and performance of the exemplary embodiments described with respect to FIGS. 1-3.

The exemplary embodiments described with respect to FIGS. 1-3 can be used to store information relating to various processes described herein. This information can be stored in one or more memories, such as a hard disk, optical disk, magneto-optical disk, RAM, and the like, of the devices and sub-systems of the exemplary embodiments. One or more databases of the devices and subsystems can store the information used to implement the exemplary embodiments. The databases can be organized using data structures, such as records, tables, arrays, fields, graphs, trees, lists, and the like, included in one or more memories, such as the memories listed above.

All or a portion of the exemplary embodiments described with respect to FIGS. 1-3 can be conveniently implemented using one or more general-purpose computer systems, microprocessors, digital signal processors, micro-controllers, and the like, programmed according to the teachings of the disclosed invention. Appropriate software can be readily prepared by programmers of ordinary skill based on the teachings of the disclosed exemplary embodiments. In addition, the exemplary embodiments can be implemented by the preparation of application-specific integrated circuits or by interconnecting an appropriate network of component circuits.

While the present invention have been described in connection with a number of exemplary embodiments and implementations, the present invention is not so limited but rather covers various modifications and equivalent arrangements, which fall within the purview of the appended claims.

What is claimed is:

1. A method for video production, the method comprising:
adding a video mixer integrated within an Auxiliary Bus of a Video Production Switcher;
adding one or more keyers integrated within the Auxiliary Bus of the Video Production Switcher; and
adding special effects integrated within the Auxiliary Bus, the method further comprising providing a user interface, including:
a. providing a Video Production Switcher control panel;
b. including in the control panel a plurality of buttons dedicated for selection of inputs for a specific bus;
c. including in the control panel one or more buses, each capable of feeding a singularity or plurality of video processing circuits in the Video production switcher;
d. including on the control panel selecting of inputs to each layer in the Auxiliary Bus Video Mixer;
e. including on the control panel selecting of inputs to each layer in the one or more Auxiliary Bus Keyers;
f. including on the control panel controlling of a transition of the Auxiliary Bus Video Mixer;
g. including on the control panel controlling of a transition of the one or more Auxiliary Bus Keyers; and
h. including on the control panel controlling of the special effects in the one or more Auxiliary Bus Keyers.

2. The method of claim 1, further comprising dynamically allocating inputs to the Auxiliary Bus Mixer.

3. The method of claim 1, further comprising dynamically allocating inputs to the one or more Auxiliary Bus Keyers.

4. The method of claim 1, further comprising providing a plurality of the Auxiliary Bus Keyers.

5. The method of claim 1, further comprising providing a plurality of the Auxiliary Bus Keyers, without limiting the number of the Auxiliary Bus Keyers other than by the number of the Auxiliary Buses available in the Video Production Switcher.

6. The method of claim 1, further comprising providing a plurality of the Auxiliary Bus Video Mixers.

7. The method of claim 1, further comprising providing a preview output from the Auxiliary Bus Video Mixer or the one or more Auxiliary Bus Keyers.

8. The method of claim 1, further comprising adjusting timing of an Auxiliary Bus output to be earlier than a Mix Effect input.

9. The method of claim 8, further comprising re-entering the Auxiliary Bus output into the Mix Effect input.

10. The method of claim 1, further comprising generating inputs to the Auxiliary Bus inside the Auxiliary Bus.

11. The method of claim 1, wherein steps (f) and (g) include employing a Mix Effect next transition control methodology.

12. The method of claim 1, wherein steps (f) and (g) include controlling of the transition via a fader handle.

13. The method of claim 11, wherein steps (f) and (g) include controlling of the transition via Mix Effect control buttons.

14. The method of claim 13, further comprising providing a button sequence to allocate the Mix Effect control buttons to the control of the transition.

15. The method of claim 1, wherein steps (d) and (e) include re-using input buttons existing on the control panel to select the inputs.

16. The method of claim 13, further comprising providing a button sequence to allocate the Mix Effect control buttons to the control of the Auxiliary Bus Video Mixer.

17. The method of claim 13, further comprising providing a button sequence to allocate the Mix Effect control buttons to the control of the one or more Auxiliary Bus Keyers.

18. The method of claim 1, further comprising providing visual feedback to an operator indicating that the user interface is being employed.

19. The method of claim 1, further comprising allocating dedicated button buses to at least one of the Auxiliary Bus Video Mixer and the one or more Auxiliary Bus Keyers.

20. The method of claim 1, further comprising allocating dedicated buttons in the Auxiliary Bus Video Mixer to control the transition.

21. The method of claim 1, further comprising allocating dedicated buttons in the one or more Auxiliary Bus Keyers to control the transition.

22. The method of claim 1, further comprising storing and recalling control and status information comprising parameters and settings of at least one of the Auxiliary Bus Video Mixer and the one or more Auxiliary Bus Keyers via Switcher Memories.

23. The method of claim 1, wherein the method is implemented with a computer-readable medium including computer-readable instructions embedded therein and configured to cause one or more computer processors to perform the steps recited in claim 1.

24. The method of claim 1, wherein the method is implemented with a computer system having one or more hardware and/or software devices configured to perform the steps recited in claim 1.

25. The method of claim 1, further comprising providing a plurality of the Auxiliary Bus Video Mixers, without limiting the number of the Auxiliary Bus Video Mixers other than by the number of the Auxiliary Buses available in the Video Production Switcher.

26. The method of claim 1, further comprising feeding via a video input a plurality of the Auxiliary Bus Video Mixers.

27. The method of claim 1, further comprising feeding via a video input a plurality of the Auxiliary Bus Keyers.

28. The method of claim 1, further comprising providing control from a remote device, including an automation system, a peripheral control device, and a PC.

29. The method of claim 1, further comprising providing a clean feed output from the Auxiliary Bus.

30. The method of claim 8, wherein adjusting comprises adjusting timing of one or more of an output of the Auxiliary Bus Video Mixer and an output of the one or more Auxiliary Bus Keyers.

31. The method of claim 1, further comprising adjusting timing of an Auxiliary Bus output to be earlier than one or more of an input of the Auxiliary Bus Video Mixer and an input of the one or more Auxiliary Bus Keyers, and re-entering the Auxiliary Bus output into the one or more of the input of the Auxiliary Bus Video Mixer and the input of the one or more Auxiliary Bus Keyers.

32. A method for video production, the method comprising:
  adding a video mixer integrated within an Auxiliary Bus of a Video Production Switcher;
  adding one or more keyers integrated within the Auxiliary Bus of the Video Production Switcher; and
  adding special effects integrated within the Auxiliary Bus,
  the method further comprising providing a user interface, including:
  a. providing a graphical menu system for displaying status and allowing user control of the Auxiliary Bus Video Mixer;
  b. including in the graphical menu system displaying of status and allowing of user control of the one or more Auxiliary Bus Keyers;
  c. including in the graphical menu system selecting of inputs to each layer in the Auxiliary Bus Video Mixer;
  d. including in the graphical menu system selecting of inputs to each layer in the one or more Auxiliary Bus Keyers;
  e. including in the graphical menu system controlling of a transition of the Auxiliary Bus Video Mixer;
  f. including in the graphical menu system controlling of a transition of the one or more Auxiliary Bus Keyers; and
  g. including in the graphical menu system controlling of the special effects in the one or more Auxiliary Bus Keyers.

33. The method of claim 32, wherein the graphical menu system incorporates a touch screen.

34. The method of claim 32, wherein a personal computer is employed for user input.

35. The method of claim 32, wherein step (a) includes employing a plurality of the Auxiliary Bus Video Mixers.

36. The method of claim 32, wherein step (b) includes employing a plurality of the Auxiliary Bus Keyers.

37. The method of claim 32, wherein steps (e) and (f) include employing a Mix Effect next transition control methodology.

38. A video production system, the system comprising:
  a video mixer integrated within an Auxiliary Bus of a Video Production Switcher;
  one or more keyers integrated within the Auxiliary Bus of the Video Production Switcher; and
  special effects integrated within the Auxiliary Bus,
  the system further comprising a user interface, including:
  a Video Production Switcher control panel;
  wherein the control panel includes a plurality of buttons dedicated for selection of inputs for a specific bus;
  wherein the control panel includes one or more buses, each capable of feeding a singularity or plurality of video processing circuits in the Video production switcher;
  wherein the control panel includes means for selecting of inputs to each layer in the Auxiliary Bus Video Mixer;
  wherein the control panel includes means for selecting of inputs to each layer in the one or more Auxiliary Bus Keyers;
  wherein the control panel includes means for controlling of a transition of the Auxiliary Bus Video Mixer;
  wherein the control panel includes means for controlling of a transition of the one or more Auxiliary Bus Keyers; and wherein the control panel includes means for controlling of the special effects in the one or more Auxiliary Bus Keyers.

39. The system of claim 38, further comprising means for dynamically allocating inputs to the Auxiliary Bus Video Mixer.

40. The system of claim 38, further comprising means for dynamically allocating inputs to the one or more Auxiliary Bus Keyers.

41. The system of claim 38, further comprising a plurality of the Auxiliary Bus Keyers.

42. The system of claim 38, further comprising a plurality of the Auxiliary Bus Keyers, wherein a number of the Auxiliary Bus Keyers is not limited other than by a number of the Auxiliary Buses available in the Video Production Switcher.

43. The system of claim 38, further comprising a plurality of the Auxiliary Bus Video Mixers.

44. The system of claim 38, further comprising means for providing a preview output from the Auxiliary Bus Video Mixer or the one or more Auxiliary Bus Keyers.

45. The system of claim 38, further comprising means for adjusting timing of an Auxiliary Bus to be output earlier than a Mix Effect input.

46. The system of claim 45, further comprising means for re-entering the Auxiliary Bus output into the Mix Effect input.

47. The system of claim 38, further comprising means for generating inputs to the Auxiliary Bus inside the Auxiliary Bus.

48. The system of claim 38, wherein a Mix Effect next transition control methodology is employed for controlling of the transition.

49. The system of claim 38, further comprising a fader handle for controlling of the transition.

50. The system of claim 48, further comprising Mix Effect control buttons for controlling of the transition.

51. The system of claim 50, further comprising means for providing a button sequence to allocate the Mix Effect control buttons to the control of the transition.

52. The system of claim 38, further comprising means for re-using input buttons existing on the control panel to select the inputs.

53. The system of claim 50, further comprising means for providing a button sequence to allocate the Mix Effect control buttons to the control of the Auxiliary Bus Video Mixer.

54. The system of claim 50, further comprising means for providing a button sequence to allocate the Mix Effect control buttons to the control of the one or more Auxiliary Bus Keyers.

55. The system of claim 38, further comprising means for providing visual feedback to an operator indicating that the user interface is being employed.

56. The system of claim 38, further comprising dedicated button buses allocated to at least one of the Auxiliary Bus Video Mixer and the one or more Auxiliary Bus Keyers.

57. The system of claim 38, further comprising dedicated buttons allocated in the Auxiliary Bus Video Mixer to control the transition.

58. The system of claim 38, further comprising dedicated buttons allocated in the one or more Auxiliary Bus Keyers to control the transition.

59. The system of claim 38, further comprising Switcher Memories for storing and recalling of control and status information comprising parameters and settings of at least one of the Auxiliary Bus Video Mixer and the one or more Auxiliary Bus Keyers.

60. The system of claim 38, wherein the system is implemented with one or more hardware and/or software devices.

61. The system of claim 38, further comprising a plurality of the Auxiliary Bus Video Mixers, wherein a number of the Auxiliary Bus Video Mixers is not limited other than by a number of the Auxiliary Buses available in the Video Production Switcher.

62. The system of claim 38, further comprising a video input feeding a plurality of the Auxiliary Bus Video Mixers.

63. The system of claim 38, further comprising a video input feeding a plurality of the Auxiliary Bus Keyers.

64. The system of claim 38, further comprising means for providing control from a remote device, including an automation system, a peripheral control device, and a PC.

65. The system of claim 38, further comprising a clean feed output from the Auxiliary Bus.

66. The system of claim 45, wherein the means for adjusting adjusts timing of one or more of an output of the Auxiliary Bus Video Mixer and an output of the one or more Auxiliary Bus Keyers.

67. The system of claim 38, further comprising means for adjusting timing of an Auxiliary Bus output to be earlier than one or more of an input of the Auxiliary Bus Video Mixer and an input of the one or more Auxiliary Bus Keyers, and means for re-entering the Auxiliary Bus output into the one or more of the input of the Auxiliary Bus Video Mixer and the input of the one or more Auxiliary Bus Keyers.

68. A video production system, the system comprising:
a video mixer integrated within an Auxiliary Bus of a Video Production Switcher;
one or more keyers integrated within the Auxiliary Bus of the Video Production Switcher; and
special effects integrated within the Auxiliary Bus,
the system further comprising a user interface, including:
a graphical menu system for displaying status and allowing user control of the Auxiliary Bus Video Mixer;
wherein the graphical menu system includes means for displaying of status and allowing of user control of the one or more Auxiliary Bus Keyers;
wherein the graphical menu system includes means for selecting of inputs to each layer in the Auxiliary Bus Video Mixer;
wherein the graphical menu system includes means for selecting of inputs to each layer in the one or more Auxiliary Bus Keyers;
wherein the graphical menu system includes means for controlling of a transition of the Auxiliary Bus Video Mixer;
wherein the graphical menu system includes means for controlling of a transition of the one or more Auxiliary Bus Keyers; and
wherein the graphical menu system includes means for controlling of the special effects in the one or more Auxiliary Bus Keyers.

69. The system of claim 68, wherein the graphical menu system includes a touch screen.

70. The system of claim 68, further comprising a personal computer for user input.

71. The system of claim 68, further comprising a plurality of the Auxiliary Bus Video Mixers.

72. The system of claim 68, further comprising a plurality of the Auxiliary Bus Keyers.

73. The system of claim 68, further comprising a Mix Effect next transition control methodology for controlling the transition.

74. A video production device, the device comprising:
a video mixer integrated within an Auxiliary Bus of a Video Production Switcher;
one or more keyers integrated within the Auxiliary Bus of the Video Production Switcher; and
special effects integrated within the Auxiliary Bus,
the device further comprising a user interface, including:
a Video Production Switcher control panel;
wherein the control panel includes a plurality of buttons dedicated for selection of inputs for a specific bus;
wherein the control panel includes one or more buses, each capable of feeding a singularity or plurality of video processing circuits in the Video production switcher;
wherein the control panel includes means for selecting of inputs to each layer in the Auxiliary Bus Video Mixer;
wherein the control panel includes means for selecting of inputs to each layer in the one or more Auxiliary Bus Keyers;
wherein the control panel includes means for controlling of a transition of the Auxiliary Bus Video Mixer;
wherein the control panel includes means for controlling of a transition of the one or more Auxiliary Bus Keyers; and
wherein the control panel includes means for controlling of the special effects in the one or more Auxiliary Bus Keyers.

75. The device of claim 74, further comprising means for dynamically allocating inputs to the Auxiliary Bus Video Mixer.

76. The device of claim 74, further comprising means for dynamically allocating inputs to the one or more Auxiliary Bus Keyers.

77. The device of claim 74, further comprising a plurality of the Auxiliary Bus Keyers.

78. The device of claim 74, further comprising a plurality of the Auxiliary Bus Keyers, wherein a number of the Auxiliary Bus Keyers is not limited other than by a number of the Auxiliary Buses available in the Video Production Switcher.

79. The device of claim 74, further comprising a plurality of the Auxiliary Bus Video Mixers.

80. The device of claim 74, further comprising means for providing a preview output from the Auxiliary Bus Video Mixer or the one or more Auxiliary Bus Keyers.

81. The device of claim 74, further comprising means for adjusting timing of an Auxiliary Bus output to be earlier than a Mix Effect input.

82. The device of claim 81, further comprising means for re-entering the Auxiliary Bus output into the Mix Effect input.

83. The device of claim 74, further comprising means for generating inputs to the Auxiliary Bus inside the Auxiliary Bus.

84. The device of claim 74, wherein a Mix Effect next transition control methodology is employed for controlling of the transition.

85. The device of claim 74, further comprising a fader handle for controlling of the transition.

86. The device of claim 84, further comprising Mix Effect control buttons for controlling of the transition.

87. The device of claim 86, further comprising means for providing a button sequence to allocate the Mix Effect control buttons to the control of the transition.

88. The device of claim 74, further comprising means for re-using input buttons existing on the control panel to select the inputs.

89. The device of claim 86, further comprising means for providing a button sequence to allocate the Mix Effect control buttons to the control of the Auxiliary Bus Video Mixer.

90. The device of claim 86, further comprising means for providing a button sequence to allocate the Mix Effect control buttons to the control of the one or more Auxiliary Bus Keyers.

91. The device of claim 74, further comprising means for providing visual feedback to an operator indicating that the user interface is being employed.

92. The device of claim 74, further comprising dedicated button buses allocated to at least one of the Auxiliary Bus Video Mixer and the one or more Auxiliary Bus Keyers.

93. The device of claim 74, further comprising dedicated buttons allocated in the Auxiliary Bus Video Mixer to control the transition.

94. The device of claim 74, further comprising dedicated buttons allocated in the one or more Auxiliary Bus Keyers to control the transition.

95. The device of claim 74, further comprising Switcher Memories for storing and recalling of control and status information comprising parameters and settings of at least one of the Auxiliary Bus Video Mixer and the one or more Auxiliary Bus Keyers.

96. The device of claim 74, wherein the device is implemented with one or more hardware and/or software devices.

97. The device of claim 74, further comprising a plurality of the Auxiliary Bus Video Mixers, wherein a number of the Auxiliary Bus Video Mixers is not limited other than by a number of the Auxiliary Buses available in the Video Production Switcher.

98. The device of claim 74, further comprising a video input feeding a plurality of the Auxiliary Bus Video Mixers.

99. The device of claim 74, further comprising a video input feeding a plurality of the Auxiliary Bus Keyers.

100. The device of claim 74, further comprising means for providing control from a remote device, including an automation system, a peripheral control device, and a PC.

101. The device of claim 74, further comprising a clean feed output from the Auxiliary Bus.

102. The device of claim 81, wherein the means for adjusting adjusts timing of one or more of an output of the Auxiliary Bus Video Mixer and an output of the one or more Auxiliary Bus Keyers.

103. The device of claim 74, further comprising means for adjusting timing of an Auxiliary Bus output to be earlier than one or more of an input of the Auxiliary Bus Video Mixer and an input of the one or more Auxiliary Bus Keyers, and means for re-entering the Auxiliary Bus output into the one or more of the input of the Auxiliary Bus Video Mixer and the input of the one or more Auxiliary Bus Keyers.

104. A video production device, the device comprising:
a video mixer integrated within an Auxiliary Bus of a Video Production Switcher;
one or more keyers integrated within the Auxiliary Bus of the Video Production Switcher; and
special effects integrated within the Auxiliary Bus
the device further comprising a user interface, including:
a graphical menu system for displaying status and allowing user control of the Auxiliary Bus Video Mixer;
wherein the graphical menu system includes means for displaying of status and allowing of user control of the one or more Auxiliary Bus Keyers;
wherein the graphical menu system includes means for selecting of inputs to each layer in the Auxiliary Bus Video Mixer;
wherein the graphical menu system includes means for selecting of inputs to each layer in the one or more Auxiliary Bus Keyers;

wherein the graphical menu system includes means for controlling of a transition of the Auxiliary Bus Video Mixer;

wherein the graphical menu system includes means for controlling of a transition of the one or more Auxiliary Bus Keyers; and wherein the graphical menu system includes means for controlling of the special effects in the one or more Auxiliary Bus Keyers.

105. The device of claim 104, wherein the graphical menu system includes a touch screen.

106. The device of claim 104, further comprising a personal computer for user input.

107. The device of claim 104, further comprising a plurality of the Auxiliary Bus Video Mixers.

108. The device of claim 104, further comprising a plurality of the Auxiliary Bus Keyers.

109. The device of claim 104, further comprising a Mix Effect next transition control methodology for controlling the transition.

110. A computer-readable medium including computer-readable instructions embedded therein for video production and configured to cause one or more computer processors to perform the steps of:

adding a video mixer integrated within an Auxiliary Bus of a Video Production Switcher;

adding one or more keyers integrated within the Auxiliary Bus of the Video Production Switcher; and adding special effects integrated within the Auxiliary Bus, the computer readable medium further comprising computer-readable instructions configured to cause the one or more computer processors to perform the step of providing a user interface, including:

a. providing a Video Production Switcher control panel;
b. including in the control panel a plurality of buttons dedicated for selection of inputs for a specific bus;
c. including in the control panel one or more buses, each capable of feeding a singularity or plurality of video processing circuits in the Video production switcher;
d. including on the control panel selecting of inputs to each layer in the Auxiliary Bus Video Mixer;
e. including on the control panel selecting of inputs to each layer in the one or more Auxiliary Bus Keyers;
f. including on the control panel controlling of a transition of the Auxiliary Bus Video Mixer;
g. including on the control panel controlling of a transition of the one or more Auxiliary Bus Keyers; and
h. including on the control panel controlling of the special effects in the one or more Auxiliary Bus Keyers.

111. The computer readable medium of claim 110, further comprising computer-readable instructions configured to cause the one or more computer processors to perform the step of dynamically allocating inputs to the Auxiliary Bus Video Mixer.

112. The computer readable medium of claim 110, further comprising computer-readable instructions configured to cause the one or more computer processors to perform the step of dynamically allocating inputs to the one or more Auxiliary Bus Keyers.

113. The computer readable medium of claim 110, further comprising computer-readable instructions configured to cause the one or more computer processors to perform the step of providing a plurality of the Auxiliary Bus Keyers.

114. The computer readable medium of claim 110, further comprising computer-readable instructions configured to cause the one or more computer processors to perform the steps of providing a plurality of the Auxiliary Bus Keyers, without limiting the number of the Auxiliary Bus Keyers other than by the number of the Auxiliary Buses available in the Video Production Switcher.

115. The computer readable medium of claim 110, further comprising computer-readable instructions configured to cause the one or more computer processors to perform the step of providing a plurality of the Auxiliary Bus Video Mixers.

116. The computer readable medium of claim 110, further comprising computer-readable instructions configured to cause the one or more computer processors to perform the step of providing a preview output from the Auxiliary Bus Video Mixer or the one or more Auxiliary Bus Keyers.

117. The computer readable medium of claim 110, further comprising computer-readable instructions configured to cause the one or more computer processors to perform the step of adjusting timing of an Auxiliary Bus output to be earlier than a Mix Effect input.

118. The computer readable medium of claim 117, further comprising computer-readable instructions configured to cause the one or more computer processors to perform the step of re-entering the Auxiliary Bus output into the Mix Effect input.

119. The computer readable medium of claim 110, further comprising computer-readable instructions configured to cause the one or more computer processors to perform the step of generating inputs to the Auxiliary Bus inside the Auxiliary Bus.

120. The computer readable medium of claim 110, wherein steps (f) and (g) include employing a Mix Effect next transition control methodology.

121. The computer readable medium of claim 110, wherein steps (f) and (g) include controlling of the transition via a fader handle.

122. The computer readable medium of claim 120, wherein steps (f) and (g) include controlling of the transition via Mix Effect control buttons.

123. The computer readable medium of claim 122, further comprising computer-readable instructions configured to cause the one or more computer processors to perform the step of providing a button sequence to allocate the Mix Effect control buttons to the control of the transition.

124. The computer readable medium of claim 110, wherein steps (d) and (e) include re-using input buttons existing on the control panel to select the inputs.

125. The computer readable medium of claim 122, further comprising computer-readable instructions configured to cause the one or more computer processors to perform the step of providing a button sequence to allocate the Mix Effect control buttons to the control of the Auxiliary Bus Video Mixer.

126. The computer readable medium of claim 122, further comprising computer-readable instructions configured to cause the one or more computer processors to perform the step of providing a button sequence to allocate the Mix Effect control buttons to the control of the one or more Auxiliary Bus Keyers.

127. The computer readable medium of claim 110, further comprising computer-readable instructions configured to cause the one or more computer processors to perform the step of providing visual feedback to an operator indicating that the user interface is being employed.

128. The computer readable medium of claim 110, further comprising computer-readable instructions configured to cause the one or more computer processors to perform the step of allocating dedicated button buses to at least one of the Auxiliary Bus Video Mixer and the one or more Auxiliary Bus Keyers.

129. The computer readable medium of claim 110, further comprising computer-readable instructions configured to cause the one or more computer processors to perform the step of allocating dedicated buttons in the Auxiliary Bus Video Mixer to control the transition.

130. The computer readable medium of claim 110, further comprising computer-readable instructions configured to cause the one or more computer processors to perform the step of allocating dedicated buttons in the one or more Auxiliary Bus Keyers to control the transition.

131. The computer readable medium of claim 110, further comprising computer-readable instructions configured to cause the one or more computer processors to perform the step of storing and recalling control and status information comprising parameters and settings of at least one of the Auxiliary Bus Video Mixer and the one or more Auxiliary Bus Keyers via Switcher Memories.

132. The computer readable medium of claim 110, further comprising computer-readable instructions configured to cause the one or more computer processors to perform the steps of providing a plurality of the Auxiliary Bus Video Mixers, without limiting the number of the Auxiliary Bus Video Mixers other than by the number of the Auxiliary Buses available in the Video Production Switcher.

133. The computer readable medium of claim 110, further comprising computer-readable instructions configured to cause the one or more computer processors to perform the step of feeding via a video input a plurality of the Auxiliary Bus Video Mixers.

134. The computer readable medium of claim 110, further comprising computer-readable instructions configured to cause the one or more computer processors to perform the step of feeding via a video input a plurality of the Auxiliary Bus Keyers.

135. The computer readable medium of claim 110, further comprising computer-readable instructions configured to cause the one or more computer processors to perform the steps of providing control from a remote device, including an automation system, a peripheral control device, and a PC.

136. The computer readable medium of claim 110, further comprising computer-readable instructions configured to cause the one or more computer processors to perform the steps of providing a clean feed output from the Auxiliary Bus.

137. The computer readable medium of claim 117, wherein the step of adjusting comprises adjusting timing of one or more of an output of the Auxiliary Bus Video Mixer and an output of the one or more Auxiliary Bus Keyers.

138. The computer readable medium of claim 110, further comprising computer-readable instructions configured to cause the one or more computer processors to perform the steps of adjusting timing of an Auxiliary Bus output to be earlier than one or more of an input of the Auxiliary Bus Video Mixer and an input of the one or more Auxiliary Bus Keyers, and re-entering the Auxiliary Bus output into the one or more of the input of the Auxiliary Bus Video Mixer and the input of the one or more Auxiliary Bus Keyers.

139. A computer-readable medium including computer-readable instructions embedded therein for video production and configured to cause one or more computer processors to perform the steps of:
adding a video mixer integrated within an Auxiliary Bus of a Video Production Switcher;
adding one or more keyers integrated within the Auxiliary Bus of the Video Production Switcher; and
adding special effects integrated within the Auxiliary Bus, the computer readable medium further comprising computer-readable instructions configured to cause the one or more computer processors to perform the step of providing a user interface, including:
a. providing a graphical menu system for displaying status and allowing user control of the Auxiliary Bus Video Mixer;
b. including in the graphical menu system displaying of status and allowing of user control of the one or more Auxiliary Bus Keyers;
c. including in the graphical menu system selecting of inputs to each layer in the Auxiliary Bus Video Mixer;
d. including in the graphical menu system selecting of inputs to each layer in the one or more Auxiliary Bus Keyers;
e. including in the graphical menu system controlling of a transition of the Auxiliary Bus Video Mixer;
f. including in the graphical menu system controlling of a transition of the one or more Auxiliary Bus Keyers; and
g. including in the graphical menu system controlling of the special effects in the one or more Auxiliary Bus Keyers.

140. The computer readable medium of claim 139, wherein the graphical menu system incorporates a touch screen.

141. The computer readable medium of claim 139, wherein a personal computer is employed for user input.

142. The computer readable medium of claim 139, wherein step (a) includes employing a plurality of the Auxiliary Bus Video Mixers.

143. The computer readable medium of claim 139, wherein step (b) includes employing a plurality of the Auxiliary Bus Keyers.

144. The computer readable medium of claim 139, wherein steps (e) and (f) include employing a Mix Effect next transition control methodology.

145. A method for video production, the method comprising:
adding a video mixer integrated within an Auxiliary Bus of a Video Production Switcher;
adding one or more keyers integrated within the Auxiliary Bus of the Video Production Switcher; and
adding special effects integrated within the Auxiliary Bus, the method further comprising providing control of the Auxiliary Bus Video Mixer through a communication protocol, and:
a. including on the communication protocol status information regarding a state of the Auxiliary Bus Video Mixer;
b. including on the communication protocol selecting of inputs to each layer in the Auxiliary Bus Video Mixer;
c. including on the communication protocol selecting of inputs to each layer in the one or more Auxiliary Bus Keyers;
d. including on the communication protocol controlling of a transition of the Auxiliary Bus Video Mixer;
e. including on the communication protocol controlling of a transition of the one or more Auxiliary Bus Keyers; and
f. including on the communication protocol controlling of the special effects in the one or more Auxiliary Bus Keyers.

146. A video production system, the system comprising:
a video mixer integrated within an Auxiliary Bus of a Video Production Switcher;
one or more keyers integrated within the Auxiliary Bus of the Video Production Switcher; and
special effects integrated within the Auxiliary Bus, the system further comprising a communication protocol for providing control of the Auxiliary Bus Video Mixer;

wherein the communication protocol is used to provide status information regarding a state of the Auxiliary Bus Video Mixer;

wherein the communication protocol is used to select inputs to each layer in the Auxiliary Bus Video Mixer;

wherein the communication protocol is used to select inputs to each layer in the one or more Auxiliary Bus Keyers;

wherein the communication protocol is used to control a transition of the Auxiliary Bus Video Mixer;

wherein the communication protocol is used to control a transition of the one or more Auxiliary Bus Keyers; and wherein the communication protocol is used to control the special effects in the one or more Auxiliary Bus Keyers.

147. A video production device, the device comprising:

a video mixer integrated within an Auxiliary Bus of a Video Production Switcher;

one or more keyers integrated within the Auxiliary Bus of the Video Production Switcher; and special effects integrated within the Auxiliary Bus, the device further comprising a communication protocol for providing control of the Auxiliary Bus Video Mixer;

wherein the communication protocol is used to provide status information regarding a state of the Auxiliary Bus Video Mixer;

wherein the communication protocol is used to select inputs to each layer in the Auxiliary Bus Video Mixer;

wherein the communication protocol is used to select inputs to each layer in the one or more Auxiliary Bus Keyers;

wherein the communication protocol is used to control a transition of the Auxiliary Bus Video Mixer;

wherein the communication protocol is used to control a transition of the one or more Auxiliary Bus Keyers; and wherein the communication protocol is used to control the special effects in the one or more Auxiliary Bus Keyers.

148. A computer-readable medium including computer-readable instructions embedded therein for video production and configured to cause one or more computer processors to perform the steps of:

adding a video mixer integrated within an Auxiliary Bus of a Video Production Switcher;

adding one or more keyers integrated within the Auxiliary Bus of the Video Production Switcher; and adding special effects integrated within the Auxiliary Bus, the computer readable medium further comprising computer-readable instructions configured to cause the one or more computer processors to perform the steps of providing control of the Auxiliary Bus Video Mixer through a communication protocol, and:

a. including on the communication protocol status information regarding a state of the Auxiliary Bus Video Mixer;

b. including on the communication protocol selecting of inputs to each layer in the Auxiliary Bus Video Mixer;

c. including on the communication protocol selecting of inputs to each layer in the one or more Auxiliary Bus Keyers;

d. including on the communication protocol controlling of a transition of the Auxiliary Bus Video Mixer;

e. including on the communication protocol controlling of a transition of the one or more Auxiliary Bus Keyers; and f including on the communication protocol controlling of the special effects in the one or more Auxiliary Bus Keyers.

149. A method for video production, the method comprising:

adding a video mixer integrated within an Auxiliary Bus of a Video Production Switcher;

adding one or more keyers integrated within the Auxiliary Bus of the Video Production Switcher; and adding special effects integrated within the Auxiliary Bus, the method further comprising providing control of the Auxiliary Bus Video Mixer through a software API layer, and:

a. including on the software API layer status information regarding a state of the Auxiliary Bus Video Mixer;

b. including on the software API layer selecting of inputs to each layer in the Auxiliary Bus Video Mixer;

c. including on the software API layer selecting of inputs to each layer in the one or more Auxiliary Bus Keyers;

d. including on the software API layer controlling of a transition of the Auxiliary Bus Video Mixer;

e. including on the software API layer controlling of a transition of the one or more Auxiliary Bus Keyers; and f including on the software API layer controlling of the special effects in the one or more Auxiliary Bus Keyers.

150. A video production system, the system comprising:

a video mixer integrated within an Auxiliary Bus of a Video Production Switcher;

one or more keyers integrated within the Auxiliary Bus of the Video Production Switcher; and special effects integrated within the Auxiliary Bus, the system further comprising a software API layer for providing control of the Auxiliary Bus Video Mixer;

wherein the software API layer is used to provide status information regarding a state of the Auxiliary Bus Video Mixer;

wherein the software API layer is used to select inputs to each layer in the Auxiliary Bus Video Mixer;

wherein the software API layer is used to select inputs to each layer in the one or more Auxiliary Bus Keyers;

wherein the software API layer is used to control a transition of the Auxiliary Bus Video Mixer;

wherein the software API layer is used to control a transition of the one or more Auxiliary Bus Keyers; and wherein the software API layer is used to control the special effects in the one or more Auxiliary Bus Keyers.

151. A video production device, the device comprising:

a video mixer integrated within an Auxiliary Bus of a Video Production Switcher;

one or more keyers integrated within the Auxiliary Bus of the Video Production Switcher; and special effects integrated within the Auxiliary Bus, the device further comprising a software API layer for providing control of the Auxiliary Bus Video Mixer;

wherein the software API layer is used to provide status information regarding a state of the Auxiliary Bus Video Mixer;

wherein the software API layer is used to select inputs to each layer in the Auxiliary Bus Video Mixer;

wherein the communication protocol is used to select inputs to each layer in the one or more Auxiliary Bus Keyers;

wherein the software API layer is used to control a transition of the Auxiliary Bus Video Mixer;

wherein the software API layer is used to control a transition of the one or more Auxiliary Bus Keyers; and wherein the software API layer is used to control the special effects in the one or more Auxiliary Bus Keyers.

152. A computer-readable medium including computer-readable instructions embedded therein for video production and configured to cause one or more computer processors to perform the steps of:
- adding a video mixer integrated within an Auxiliary Bus of a Video Production Switcher;
- adding one or more keyers integrated within the Auxiliary Bus of the Video Production Switcher; and
- adding special effects integrated within the Auxiliary Bus,
- the computer readable medium further comprising computer-readable instructions configured to cause the one or more computer processors to perform the steps of providing control of the Auxiliary Bus Video Mixer through a software API layer, and:
  a. including on the software API layer status information regarding a state of the Auxiliary Bus Video Mixer;
  b. including on the software API layer selecting of inputs to each layer in the Auxiliary Bus Video Mixer;
  c. including on the software API layer selecting of inputs to each layer in the one or more Auxiliary Bus Keyers;
  d. including on the software API layer controlling of a transition of the Auxiliary Bus Video Mixer;
  e. including on the software API layer controlling of a transition of the one or more Auxiliary Bus Keyers; and
  f. including on the software API layer controlling of the special effects in the one or more Auxiliary Bus Keyers.

153. A method for video production, the method comprising:
- adding a video mixer integrated within an Auxiliary Bus of a Video Production Switcher;
- adding one or more keyers integrated within the Auxiliary Bus of the Video Production Switcher; and
- adding special effects integrated within the Auxiliary Bus,
- the method further comprising:
  - providing Auxiliary Bus Video Mixer building blocks, video transition blocks, and special effects building blocks; and
  - providing in a user interface control of the blocks, including:
    - controlling of the blocks during standard operation,
    - controlling which of available video inputs feed into which of the blocks,
    - controlling which video outputs from the Auxiliary Bus Video Mixer building blocks feed which video outputs of the Auxiliary Bus,
    - controlling which of the video transition blocks are connected to which of the Auxiliary Bus Video Mixer building blocks, and
    - controlling which of the special effects building blocks are connected to which of the Auxiliary Bus Video Mixer building blocks.

154. A video production system, the system comprising:
- a video mixer integrated within an Auxiliary Bus of a Video Production Switcher;
- one or more keyers integrated within the Auxiliary Bus of the Video Production Switcher; and
- special effects integrated within the Auxiliary Bus,
- the system further comprising:
- Auxiliary Bus Video Mixer building blocks, video transition blocks, and special effects building blocks; and
- a user interface for control of the blocks, including controlling of the blocks during standard operation, controlling which of available video inputs feed into which of the blocks, controlling which video outputs from the Auxiliary Bus Video Mixer building blocks feed which video outputs of the Auxiliary Bus, controlling which of the video transition blocks are connected to which of the Auxiliary Bus Video Mixer building blocks, and controlling which of the special effects building blocks are connected to which of the Auxiliary Bus Video Mixer building blocks.

155. A video production device, the device comprising:
- a video mixer integrated within an Auxiliary Bus of a Video Production Switcher;
- one or more keyers integrated within the Auxiliary Bus of the Video Production Switcher; and
- special effects integrated within the Auxiliary Bus,
- the device further comprising:
- Auxiliary Bus Video Mixer building blocks, video transition blocks, and special effects building blocks; and
- a user interface for control of the blocks, including controlling of the blocks during standard operation, controlling which of available video inputs feed into which of the blocks, controlling which video outputs from the Auxiliary Bus Video Mixer building blocks feed which video outputs of the Auxiliary Bus, controlling which of the video transition blocks are connected to which of the Auxiliary Bus Video Mixer building blocks, and controlling which of the special effects building blocks are connected to which of the Auxiliary Bus Video Mixer building blocks.

156. A computer-readable medium including computer-readable instructions embedded therein for video production and configured to cause one or more computer processors to perform the steps of:
- adding a video mixer integrated within an Auxiliary Bus of a Video Production Switcher;
- adding one or more keyers integrated within the Auxiliary Bus of the Video Production Switcher; and
- adding special effects integrated within the Auxiliary Bus,
- the computer readable medium further comprising computer-readable instructions configured to cause the one or more computer processors to perform the steps of:
  - providing Auxiliary Bus Video Mixer building blocks, video transition blocks, and special effects building blocks; and
  - providing in a user interface control of the blocks, including:
    - controlling of the blocks during standard operation,
    - controlling which of available video inputs feed into which of the blocks,
    - controlling which video outputs from the Auxiliary Bus Video Mixer building blocks feed which video outputs of the Auxiliary Bus,
    - controlling which of the video transition blocks are connected to which of the Auxiliary Bus Video Mixer building blocks, and
    - controlling which of the special effects building blocks are connected to which of the Auxiliary Bus Video Mixer building blocks.

\* \* \* \* \*